Aug. 24, 1965 J. J. BROPHY 3,202,973

ELECTROSTATIC REPRODUCING APPARATUS

Filed April 18, 1963

INVENTOR.
JAMES J. BROPHY
BY
James W. DeLeo[illegible]
ATTORNEY 3,202,973

ELECTROSTATIC REPRODUCING APPARATUS

James J. Brophy, Western Springs, Ill., assignor to IIT Research Institute, a corporation of Illinois Filed Apr. 18, 1963, Ser. No. 273,907
10 Claims. (Cl. 340—173)

This invention relates to electrostatic reproducing apparatus and it refers more specifically to the use of a cathode-ray tube for scanning a series of electrodes in contact with an electrostatic record medium to generate a secondary electron current proportional to the charge pattern on the medium.

Electrostatic recording and playback has been described in prior art patents and also in the literature. Most electrostatic recording processes consist of the deposition or formation of charges on a charge retentive medium whereby the charge pattern constitutes the recorded intelligence. One particular method of electrostatic recording is described in detail in co-pending patent application Serial No. 844,472, filed June 24, 1956, now U.S. Patent No. 3,159,718, issued December 1, 1964, and assigned to the present assignee. Briefly, such process involves the production of a pattern of electrical charges corresponding to the signal to be recorded on a thin charge retentive record medium. The recording is accomplished by a super imposing bias potential on the signal voltage and applying this signal to electrodes on opposite sides of the record member. By the proper selection of signal and bias voltage there results a transfer of charge of equal magnitude but opposite polarity on opposite sides of the record medium. These charges are embedded in the record member to provide a permanent charge pattern corresponding to the signal.

Various methods have been developed for the reproduction of electrostatic recordings and the present invention is principally concerned with apparatus for the reproduction of such recordings. Playback has been accomplished by mechanical scanning methods and electron beam scanning. In one method of beam scanning the beam is deflected by a row of electrodes in contact with the charged record member whereby the degree of deflection is a measure of the charge in the record. This invention accomplishes playback by electron beam scanning of an insulator covering a row or rows of electrodes in contact with the charged medium. The secondary electron current resulting from beam impingement of the insulator is altered by the charge in the medium. This secondary current is proportional to tape charge and is amplified and reproduced.

Accordingly, it is an object of this invention to provide an improved electrostatic reproducing system. It is a further object of this invention to provide an improved electrostatic reproducing system providing means for selectively scanning electrodes of a multi-dimensional field of pin electrodes by means of a cathode-ray tube. Another object of this invention is to provide an improved electrostatic recording playback system wherein a series of electrodes, in contact with the record member, is scanned by an electron beam impinging an insulator interposed therebetween such that the secondary electron emission varies as a result of the charge on said electrodes to thus provide an output which is proportional to the charge in the record medium. Yet another object is to provide an improved electrostatic playback system wherein a series of electrodes in contact with a record medium is scanned by an electron beam impinging an insulator interposed therebetween such that the D.C. secondary electron emission current is about equal to the impinging beam current to provide an output signal which varies in proportion to the induced charge on said electrodes as they are scanned. Other objects and advantages of this invention will become more apparent and appreciated as the same is more thoroughly described by reference to the following detailed description in connection with the accompanying drawings, in which:

Figure 3:
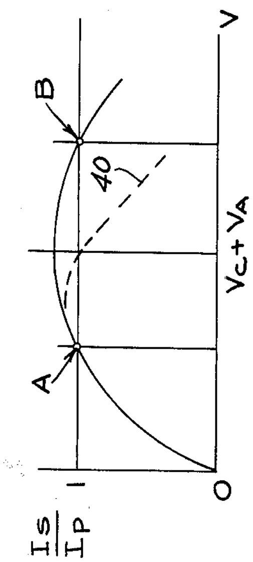
FIGURE 3 is a curve representing the secondary emitting properties of insulators useful in describing and explaining the operation of this invention.
Figure 1:
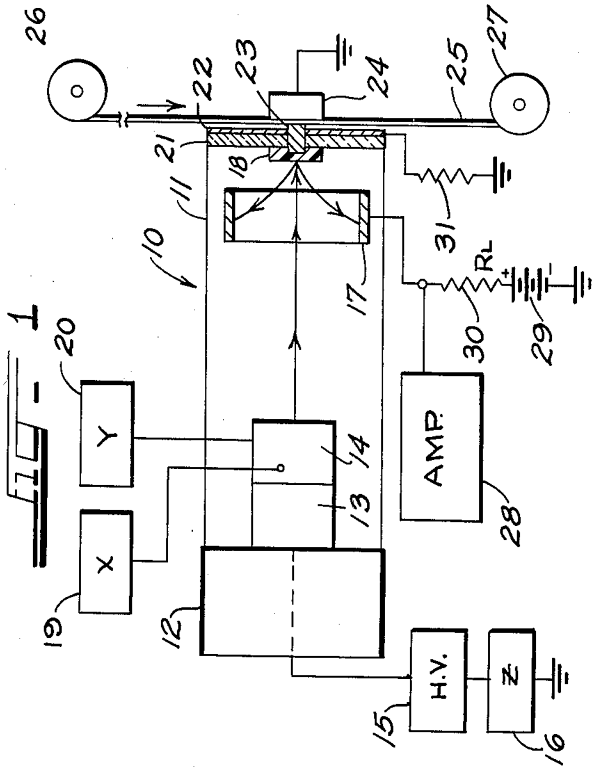
FIGURE 1 is a schematic of an electrostatic reproducing system in accordance with the invention.
Figure 2:
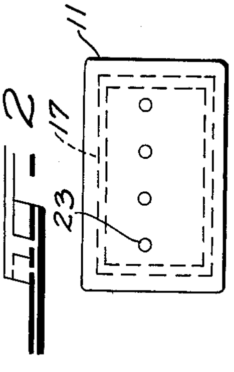
FIGURE 2 is a view of the end wall of the electron tube.

Referring now to FIGURES 1 to 3 there is shown a conventional cathode-ray tube 10 including an electron gun 13 and deflection means 14. The deflecting means 14 may be electrostatic or magnetic and is controlled by conventional means such as sweep generators 19 and 20 for X and Y beam deflection respectively. The tube voltages are supplied by high voltage source 15 and battery 29. The potential of source 15 ranges from 50 volts to about 2,000 volts depending on the operating parameters. Similarly battery 29 ranges from about 5 volts to 100 volts D.C. Means 16 is useful in adjusting for uniform response over the beam sweep width or for cutting the beam off on the return trace. Also, Z axis or intensity modulation may be provided by means 16.

The evacuated glass envelope 11 extending from base 12 terminates in end face 21. A series of electrodes 23 are embedded in face 21 in a manner whereby they provide a contact surface on the exterior of tube 10 for tape 25. The interior surfaces of electrodes 23 are covered by insulator 18. Suspended proximately to electrodes 23 and insulator 18 is collector ring 17.

In operation, the electron beam charges up the exposed face of insulator 18 to a potential equal to the accelerating voltage plus collector voltage because the D.C. secondary emission ratio of insulator 18 is selected to be about unity. In order to accomplish this the sum of the accelerating ($V_a$) and collector ($V_c$) voltages must be between the first and second crossover potentials of the insulator D.C. secondary emission ratio. These crossover potentials are illustrated generally in FIGURE 3. More particularly, the sum $V_a$ and $V_c$ must lie between the ordinates A and B to insure that the ratio of secondary electron current ($I_s$) to beam current (or primary current $I_p$) will always be above unity. An important consideration here is that the true secondary characteristic curve 39 of the insulator must rise above unity and that the proper operating potential of the system ($V_a+V_c$) lies between the two crossover points (A and B) on curve 39 as shown in FIGURE 3. For most materials this means the total voltage must be between approximately 50 to 1,000 volts.

The A.C. secondary characteristic is shown by curve 40. Once the properly selected insulator is charged up to operating potential the variable signal induced on electrodes 23 causes the secondary current $I_s$ to vary substantially linearly as shown by curve 40. Actually $I_s$ will vary as the resultant of the two curves but such resultant will look like curve 40 in the operating range between points A and B.

Collector 17 is effectively electrically connected to insulator 18 by the secondary electron beam. As the potential of insulator 17 varies by a change in the potential of electrodes 23, the secondary current $I_s$ varies. Collector current is coupled to resistor 30; thus any variation in $I_s$ results in a corresponding voltage change across resistor 30. The potential of electrodes 23 is determined by the electric field of tape 25 and varies with signal as tape 25 is drawn between electrodes 23 and common backing electrode 24. Tape 25 is fed from supply reel 26 by a conventional tape drive (not shown) and reeled on take-up reel 27. Thus, as the beam is scanned back and forth across insulator 18, a signal is generated across resistor 30 which corresponds to the charge in tape 25 as sensed by electrodes 23.

The signal appearing across load resistor 30 is coupled to amplifier 28 and then to any suitable device depending upon the nature of the recording. For example, the recording may be of video, digital or sound information.

Although only four electrodes are shown in the drawing, it should be understood that many such electrodes corresponding to the spatial resolution of the signal pattern in tape 25 are required. Insulator 18 covering the surface of the electrodes 23 most proximate to the electron beam may be a part of the glass envelope 11 or may be produced by deposition of a film such as silicon dioxide after the pins are sealed into the envelope. Of course, several methods of embedding electrodes 23 into the end face of tube 10 will occur to those skilled in the art. Along these lines, one particular method is set forth in U.S. Patent Number 3,041,611, issued June 26, 1962, wherein a multiplicity of holes each sealed hermetically with a filling comprising a hardened plastic and electrically conductive filler are formed in the end face of the tube. In this case the electrically conductive filler would be electrodes 23 and the holes may be made such that they do not protrude completely into the tube. Alternatively electrodes 23 may pass therethrough and be coated interiorally by a deposited film of silicon dioxide.

It is preferable to return electrodes 23 to ground by means of high resistivity film 22 and resistor 31 in order to minimize the effect of stray charging of electrodes 23 due to tribo-electric effects and leakage through insulator 18. Also, to maintain the spatial resolution determined by the spacing of electrodes 23, insulator 18 should be as thin as possible. On the other hand, the full accelerating voltage appears across insulator 18 so that it must be thick enough to withstand this electric field. The effective conductance of resistive film 22 must be large enough to minimize the stray charging yet small enough to prevent electrical shorting between adjacent electrodes 23. Both of these considerations indicate that an engineering comprise must be effected but little difficulty is encountered. Satisfactory values of the thickness of insulator 18 and the conductance of film 22 are easily arrived at under the following considerations.

Insulator 18 must have sufficient dielectric strength to withstand up to approximately 1,000 volts and along these lines a satisfactory dielectric can withstand 100,000 volts across one centimeter of thickness. Thus, insulator 18 on a conservative basis would have a maximum thickness of 0.01 centimeter. On the other hand, many dielectric materials are available which will not breakdown at much greater stresses permitting insulator 18 to be made less thick. For example, polyethylene (0.1% antioxidant) has a dielectric strength of 1,200 volts/mil at 25° C. or about 47.5 volts/micron. Polyethylene permits a thickness of about 21 microns for $V_a+V_c=1{,}000$ volts. Similarly, polytetrafluoroethylene (better known as "Teflon") has a dielectric strength of up to 2,000 volts/mil. Polytetrafluoroethylene enables further reduction in thickness of insulator 18 and works out to be about 11.7 microns for $V_a+V_c=1{,}000$ volts. Thus, it can be seen that the dielectric strength-spatial resolution problem of insulator 18 is not critical.

The effective conductance of film 22 will be primarily controlled by the sampling rate of the system. That is to say, film 22 must not discharge electrodes 23 at a rate comparable to the beam scanning rate. Otherwise, electrodes 23 would not retain substantially all of the induced charge from tape 25. This discharge rate is mainly controlled by the resistance of film 22 and the interelectrode capacitance between electrodes 23. Of course this rate may be varied by resistor 31 and external capacitors, if necessary, as is well known to those skilled in the art. A discharge time of approximately 10 times the sampling rate is satisfactory. Under this condition electrodes 23 are effectively grounded. In other words electrodes 23 will attain a certain D.C. level about which the tape signal charge will vary.

Figure 4:
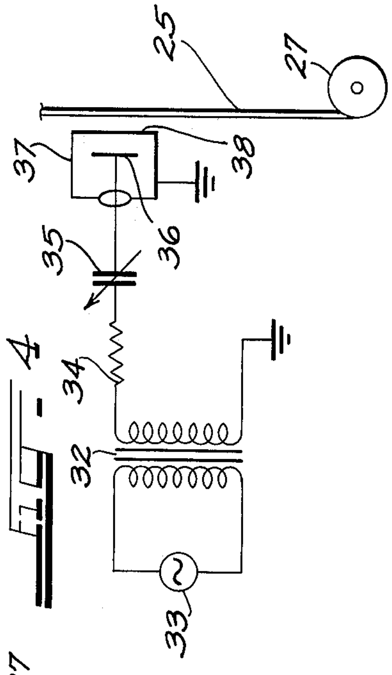
FIGURE 4 is a schematic diagram of a modification of the instant invention.

Referring now to FIGURE 4, an ion generator is illustrated which may be used to dust the tape with ions after it has passed electrodes 23 and 24. Ion dusting may or may not be used depending upon the technique of recording on tape 25. However, it has been found that in certain cases, the application of ions to the surface of a charged tape enhances the record life. It is believed, that one reason for enhancing record life is that the ions neutralize undesired surface charges in those cases where the intelligence is stored internally of the record and also such ions are believed the impede charge transfer between the adjacent coils of the tape as stored on reel 27. One such system for applying ions to tape 25 is by means of a corona generator as shown in FIGURE 4. The generator includes a conductive case 37 which is open at one side 38 and which may be provided with an electrostatic shield thereacross. Such shield may consist of a multiplicity of wires extending transversely of case 37 or alternatively, it may be a mesh screen covering the opening 38 facing tape 25. Preferably, case 37 is grounded. A transformer 32 has its output connected between case 37 and a pointed tungsten electrode 36 disposed within case 37. Electrode 36 is insulated from case 37.

Transformer 32 may be of any conventional type, and preferably is powered by commercial voltage or source 33 at a commercial frequency. Transformer 32 should have a primary-to-secondary ratio such that the output voltage is in the neighborhood of about 4,000 volts. In the embodiment illustrated, one side of the secondary of transformer 32 is grounded while the other side is connected in series with a current limiting resistor 34, variable capacitor 35 and then through a high voltage conductor to electrode 36. Application of voltages described will produce a slight corona at each of the tips of electrodes 36 and air diffuses through the open side 38 to become ionized and when ionized, diffuses back again against tape 25. With this arrangement, sufficient positive and negative ions are produced and made available outside case 37 to neutralize the beforementioned unwanted charges. Variable capacitor 35 is included to provide adjustment of the quantity of positive and negative ions. Ordinarily the circuit should be adjusted for equal quantities of both.

It should be noted that the A.C. field is applied between electrode 36 and case 37, and therefore the field does not extend outwardly of the ion source to provide a source of interference or of permanent signals to the tape. While only one particular source of ions has been described, it should be noted that many other suitable arrangements may be used as will occur to those skilled in this particular art.

Backing electrode 24 is conductive and may consist of a multiplicity of curved wires adjacent each other in a plane parallel to the surface of tape 25 such that they will bear a slight pressure against tape 25 to insure intimate contact against electrodes 23 while at the same time providing a return path for the electric circuit. Alternatively, backing electrode 24 may consist of a felt or soft springy material impregnated with a conductive particulate such as for example, graphite. In both cases, the electrode construction has been found satisfactory for playback.

In some cases, depending upon the demands of the system, backing electrode 24 may be omitted. More particularly, in situations where fidelity and accurate high signal levels are not called for, satisfactory operation may be obtained without the use of backing electrode 24.

This invention is considered an improvement over mechanical scanning methods since the electron beam can scan across the electrodes very rapidly. It is also considered an improvement over beam deflection systems because the relatively small signal fields are not required to deflect the beam and therefore relatively high energy electron beams can be used. It is further considered an improvement over systems in which the beam strikes the electrodes directly because it is not sensitive to the secondary emission ratio of the metal electrodes and charging of the electrodes due to the beam which might interfere with the signal charges in the tape. It is still further considered an improvement over existing systems because electrodes 23 do not affect tape charge because they are effectively at ground potential.

From the foregoing it will be appreciated that many changes may be affected in the above construction without departing from the novel scope and spirit of this invention and therefore it is intended that the foregoing description and accompanying drawing not be limiting in any sense and that this invention be limited only by the scope of the appended claims.

1. An electrostatic playback system for use with electrostatic record members comprising in combination:
an electron beam generator having an end wall;
an array of electrodes passing through said end wall with exposed surfaces for contacting a dielectric record medium;
a secondary electron emitter interposed between a normal path of said beam and said electrodes such that said beam will impinge said emitter;
scanning means for deflecting said beam across said emitter opposite said array of electrodes;
an electron collector out of the path of said beam but proximate to said emitter to collect the secondary electrons emitted thereby when said beam impinges the exposed surface thereof;
amplifying means coupled to said collector to amplify the secondary electron current; and
said emitter being an insulator, said insulator having a D.C. ratio of secondary current to beam current is about unity whereby variations in magnitude of secondary current will directly result from the influence of the induced charge on said electrodes from said record medium.

2. An electrostatic playback system for use with electrostatic record members comprising in combination:
an electron beam generator having an end wall;
an array of electrodes passing through said end wall with exposed surfaces for contacting a moving dielectric record medium;
a conductive backing electrode contacting and urging said medium against said electrodes;
a secondary electron emitter interposed between a normal path of said beam and said electrodes such that said beam will impinge said emitter;
scanning means for deflecting said beam across said emitter opposite said array of electrodes;
an electron collector out of the path of said beam but proximate to said emitter to collect the secondary electrons emitted thereby when said beam impinges the exposed surface thereof;
amplifying means coupled to said collector to amplify the secondary electron current; and
said emitter being an insulator, said insulator having a D.C. ratio of secondary current to beam current is about unity whereby variations in magnitude of secondary current will directly result from the influence of the induced charge on said electrodes from said record medium.

3. An electrostatic playback system for use with electrostatic record members comprising in combination:
an electron beam generator having an end wall;
an array of electrodes passing through said end wall and a backing electrode arranged to pass a dielectric record medium therebetween;
a secondary electron emitter interposed between a normal path of said beam and said electrodes such that said beam will impinge said emitter;
scanning means for deflecting said beam across said emitter opposite said array of electrodes;
an electron collector out of the path of said beam but proximate to said emitter to collect the secondary electrons emitted thereby when said beam impinges the exposed surface thereof;
amplifying means coupled to said collector to amplify the secondary electron current; and
said emitter being an insulator, said insulator having a D.C. ratio of secondary current to beam current is about unity whereby variations in magnitude of secondary current will result from the influence of the induced charge on said electrodes from said record medium.

4. An electrostatic playback system for use with electrostatic record members comprising in combination:
an electron beam generator having an end wall;
an array of electrodes passing through said end wall and a backing electrode arranged to pass a dielectric record medium therebetween;
a secondary electron emitter interposed between a normal path of said beam and said electrodes such that said beam will impinge said emitter;
scanning means for deflecting said beam across said emitter opposite said array of electrodes;
a secondary electron collector out of the path of said beam but proximate to said emitter to collect the secondary electrons emitted thereby when said beam impinges the exposed surface thereof;
amplifying means coupled to said collector to amplify the secondary electron current;
said emitter being an insulator, said insulator having a D.C. ratio of secondary current to beam current is about unity whereby variations in magnitude of secondary current will result from the influence of the induced charge on said electrodes from said record medium; and
an ion generator disposed proximately to said medium to emit ions onto the surface thereof.

5. An electrostatic playback system for use with electrostatic record members comprising in combination:
an electron beam generator having an end wall;
an array of electrodes passing through said end wall and a backing electrode arranged to pass a dielectric record medium therebetween;
a secondary electron emitter interposed between a normal path of said beam and said electrodes such that said beam will impinge said emitter;
scanning means for deflecting said beam across said emitter opposite said array of electrodes;
a secondary electron collector out of the path of said beam but proximate to said emitter to collect the secondary electrons emitted thereby when said beam impinges the exposed surface thereof;
amplifying means coupled to said collector to amplify the secondary electron current;
said emitter being an insulator, said insulator having a D.C. ratio of secondary current to beam current is about unity whereby variations in magnitude of secondary current will result from the influence of the induced charge on said electrodes from said record medium; and
an ion generator disposed proximately to said medium to emit ions of both polarities into the surface of said medium.

6. An electrostatic reproducer for playback of electrostatic records comprising in combination:
cathode ray tube including an electron beam current generator;
scanning means for deflecting said electron beam;
a beam impinging portion of said tube having a multiplicity of conductive electrodes passing therethrough;
a backing electrode opposite said conductive electrodes arranged to pass said records therebetween;

insulating secondary electron emitting means interposed between said electrodes and said beam with said insulating secondary electron emitting means having a D.C. ratio of secondary emission beam current to electron beam current of about unity and varied as a result of the electrostatically induced charge on said electrodes by said record in contact therewith;

secondary electron collecting means within said tube; and means connected to said collecting means responsive to the secondary electrons collected to generate a signal proportional to the magnitude thereof.

7. An electrostatic reproducer for playback of electrostatic records comprising in combination:

a cathode ray tube including an electron beam current generator;

scanning means for deflecting said electron beam;

a beam impinging portion of said tube having a multiplicity of conductive electrodes passing therethrough;

insulating secondary electron emitting means interposed between said electrodes and said beam with said insulating secondary electron emitting means having a D.C. ratio of secondary emission beam current to electron beam current of about unity and varied as a result of the electrostatically induced charge on said electrodes by said record in contact therewith;

secondary electron collecting means within said tube;

means connected to said collecting means responsive to the secondary electrons collected to generate a signal proportional thereto; and an ion generator disposed proximitely to said medium to emit ions onto the surface thereof.

8. An electrostatic reproducer for playback of electrostatic records comprising in combination:

a cathode ray tube including an electron beam current generator;

scanning means for deflecting said electron beam;

a beam impinging portion of said tube having a multiplicity of conductive electrodes passing therethrough;

a backing electrode opposite said conductive electrodes arranged to pass said records therebetween;

insulating secondary electron emitting means interposed between said electrodes and said beam with said insulating secondary electron emitting means having a D.C. ratio of secondary emission beam current to electron beam current of about unity and varied as a result of the electrostatically induced charge on said electrodes by said record in contact therewith;

secondary electron collecting means within said tube;

means connected to said collecting means responsive to the magnitude of secondary electrons collected to generate a signal proportional thereto; and an ion generator disposed between said electrodes and a record medium take up device to emit ions of both polarities onto the surfaces of said medium.

9. An electrostatic playback system for use with electrostatic record members comprising in combination:

an electron beam generator having an end wall;

an array of electrodes passing through said end wall and a backing electrode arranged to pass a dielectric record medium therebetween;

means electrically connected to said electrodes to effectively maintain the D.C. level at ground potential during operation;

a secondary electron emitter interposed between a normal path of said beam and said electrodes such that said beam will impinge said emitter;

scanning means for deflecting said beam across said emitter opposite said array of electrodes;

an electron collector out of the path of said beam but proximate to said emitter to collect the secondary electrons emitted thereby when said beam impinges the exposed surface thereof;

amplifying means coupled to said collector to amplify the secondary electron current; and said emitter being an insulator, said insulator having a D.C. ratio of secondary current to beam current is about unity whereby variations in magnitude of secondary current result from the influence of the induced charge on said electrodes from said record medium.

10. An electrostatic reproducer for playback of electrostatic records comprising in combination:

a cathode ray tube including an electron beam current generator;

scanning means for deflecting said electron beam;

a beam impinging portion of said tube having a multiplicity of conductive electrodes passing therethrough;

means electrically connected to said conductive electrodes to effectively maintain the D.C. level at ground potential during operation;

a backing electrode opposite said conductive electrodes arranged to pass said records therebetween;

insulating secondary electron emitting means interposed between said electrodes and said beam with said insulating secondary electron emitting means having a D.C. ratio of secondary emission beam current to electron beam current of about unity and varied as a result of the electrostatically induced charge on said electrodes by said record in contact therewith;

secondary electron collecting means within said tube;

means connected to said collecting means responsive to the magnitude of secondary electrons collected to generate a signal proportional thereto; and an ion generator disposed between said electrodes and a record medium take-up device to emit ions of both polarities onto the surfaces of said medium.

References Cited by the Examiner

UNITED STATES PATENTS

| | | | |
|---|---|---|---|
| 2,283,148 | 5/42 | Bruce | 178—6.6 |
| 2,861,133 | 11/58 | Herr | 179—100.2 |
| 2,900,443 | 8/59 | Camras | 179—100.2 |
| 3,040,124 | 6/62 | Camras | 346—74 X |
| 3,133,150 | 5/64 | Camras | 179—100.2 |

FOREIGN PATENTS

| | | |
|---|---|---|
| 896,691 | 5/62 | Great Britain. |

IRVING L. SRAGOW, *Primary Examiner.*